H. T. ROBBINS.
Car Brake.
No. 6,689.
2 Sheets—Sheet 1.
Patented Sept. 4, 1849.
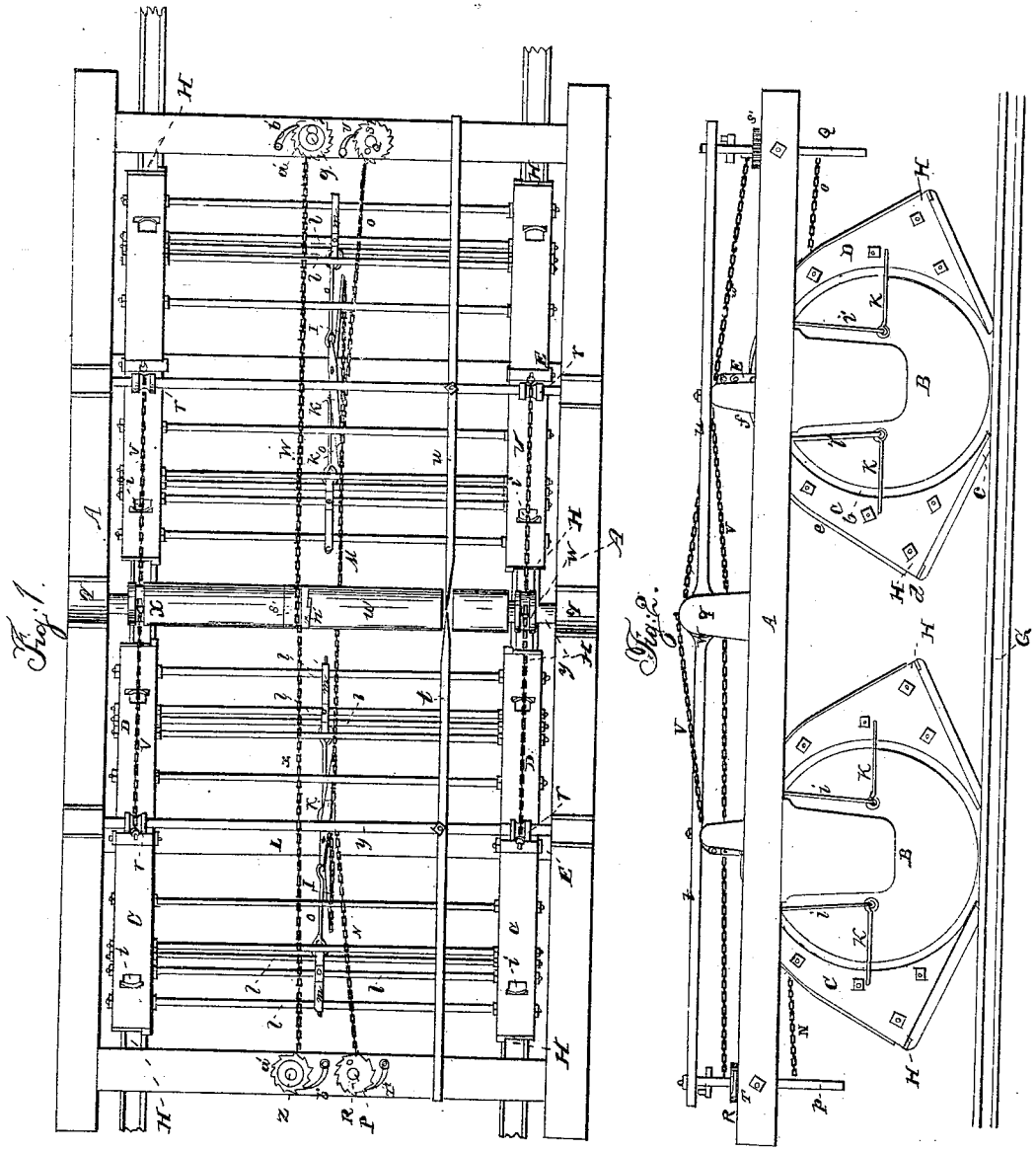

H. T. ROBBINS.
Car Brake.

No. 6,689.

2 Sheets—Sheet 2.

Patented Sept. 4, 1849.

UNITED STATES PATENT OFFICE.

HORACE T. ROBBINS, OF LOWELL, MASSACHUSETTS.

BRAKE FOR RAILROAD-CARS.

Specification of Letters Patent No. 6,689, dated September 4, 1849.

*To all whom it may concern:*

Be it known that I, HORACE T. ROBBINS, of Lowell, in the county of Middlesex and State of Massachusetts, have invented a new and useful Improvement in Friction-Brakes, for Arresting the Motion of Railway-Carriages; and I do hereby declare that the same is fully described and represented in the following specification and accompanying drawings, letters, figures, and references thereof.

My improvement in brakes is essentially different from that patented by John B. Ellenwood, on or about the twenty-sixth of September, of the year eighteen hundred and forty eight, as that of said Ellenwood was intended to be self acting and to operate only when a car became detached from a train, and was in the act of descending an inclined plane.

My improvement admits of the brakes being put into action either under such circumstances, or any others when it may become necessary to suddenly employ a great amount of friction in order to arrest the motion of one or more cars of a train.

Figure 5:
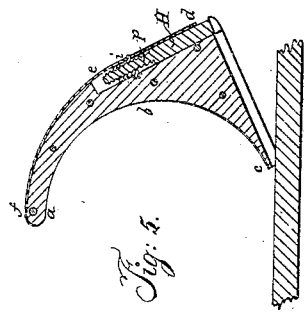
Figure 4:
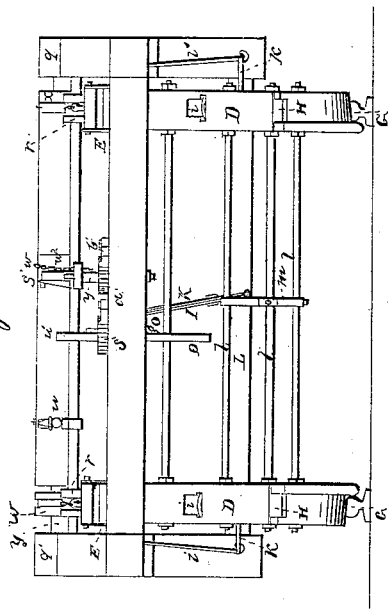
Figure 3:
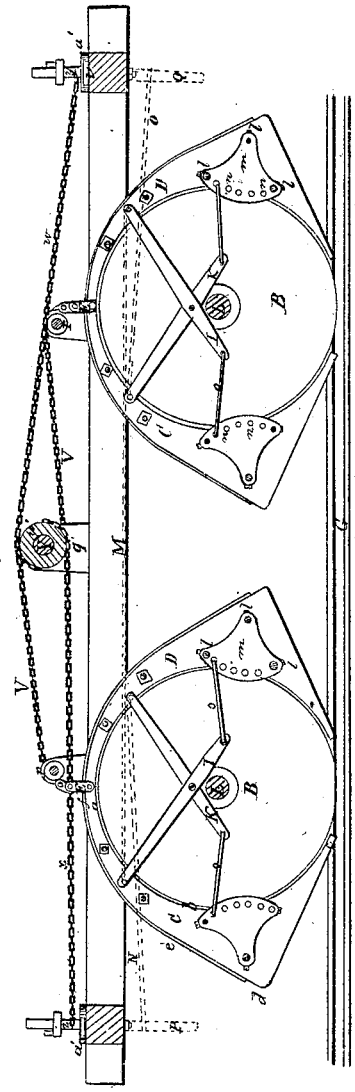

Figure 1, represents a top view of a four wheel track frame having my improved brakes applied to its wheels. Fig. 2 is a side elevation of the same. Fig. 3 is a vertical, central, and longitudinal section of it. Fig. 4, is an end view of it, and Fig. 5, is a vertical and longitudinal section of one of the brakes and a part of the rail under it, the same being made so as to exhibit the friction chisel affixed in the outer part of each brake.

In the said drawings A, denotes the truck frame constructed and having the wheels applied to it in the ordinary way. B, B, &c, are the wheels. Each of the said wheels has two brakes C, D, applied to it. The said two brakes are made to encircle or encompass, the tread or periphery of the wheel, and are jointed or hinged together at their upper ends, which are suspended to a stirrup or shackle E. The curved bearing surface *a b c*, of each brake is made nearly semicircular, and is made to extend down within a short distance of the lowest part of the tread or that which rests on the rail G, as seen in the drawings. From the lower part *c*, of the brake an additional sole or tread *c d*, is carried outward in a straight line and tangentially or about so to the curve *a b c*, at the lowest part of it. From the outer end *d*, the front part or edge *d e*, of the brake is made at right angles or thereabouts to the tread *c d*. From thence the tread curves upward as seen at *e f a*.

Such is the general form I give to each of my brakes, although I do not intend to limit my invention thereto, as the particular feature of novelty in it consists in the application to the common curved brake *a b c*, of the straight tangential tread *c d*, which is to be brought into operation by depressing the main brake *a b c*, and allowing it to slide on the tread of the wheel; that is if we by any means so drop the brakes as to turn or slide the curved surface *a b c*, on the tread of the wheel, until the lowest part of the tread *c d*, is brought into contact with the rail G, (the carriage being supposed to be in motion, and the wheel revolving in a direction from *a* to *c*,) the wheel will at once ride upon or mount the curved surface *c b*, and crowd the brake over so as to force its tread *c d*, down in contact with or upon the rail. The effect of this will be to completely block the wheel, or elevate it from the rail; the weight of the wheel and carriage, on the tread *c d* (of the brake) and the rail, thus causing the tread to slide on the rail, and by the great friction created thereby, to soon arrest the motion of the carriage.

In order to increase the friction of the tread of the brake, and particularly when ice or snow may be upon the rails, a small chisel H, may be affixed in each brake, and made to extend below its tread as seen in Figs. 1, 2, 4, and 5; the said chisel being so applied to the brake by a screw *h*, and nut *i*, or some other mechanical equivalents, as to admit of being raised or lowered below the tread to such extent as may be necessary. When the tread is forced down upon the rail the edge of the chisel meets the top surface. Consequently while the brake is moved on the rail, the chisel will slide in contact with the rail, and materially increase its friction.

As was hereinbefore mentioned two brakes are applied to each wheel, the same being in order to allow of the employment of my invention when the car is going either forward or backward on the railway. This principle may be carried out however by applying but one brake to each wheel of two wheels on the same side of a truck frame; the brake on one of the wheels being placed on one side of its tread, while that on the other wheel is arranged on the opposite side of its tread. In order to press such brake away from its wheel, I employ a spring bar $i'$, to each one, the same being inserted in and made to project down from the truck frame, and be connected with the brake by a rod $k$, as seen in Fig. 2. The brake of each wheel is connected with the opposite brake of the opposite wheel, by one or more bars or rods $l, l, l$, made to extend between them, and to pass through a quadrant plate $m$, which is firmly fixed to the middle parts of said bars, and has a series of holes $n, n, n$, bored or made through it, as seen in Fig. 3. Each of these quadrant plates has a connecting rod $o$, jointed to it and extending from it, and jointed to the lower arm of one of two crossed levers I, K, which are jointed together like the two parts of a common pair of scissors, and are disposed over the axle L, of each pair of wheels as seen in Fig. 3. A chain M, connects the upper arms of the two levers I, I. To the upper arm of each of the other levers K K, a chain N, or O, is attached, and has its other end attached to a vertical windlass P, or Q, all as seen in Fig. 3. One of the said windlasses is placed at one end of the truck frame, while the other is placed at the opposite end of it; and each has a ratchet wheel R, or S, affixed to it against and with which a spring pawl T, or U, is applied as seen in Fig. 1. By applying a key to the top of either one of the windlasses, and turning it around, we so draw upon the two sets of crossed levers I, K, I, K, as to simultaneously draw all the brakes in contact with their respective wheels. By suitably connecting either of the chains N, O, with the corresponding adjacent chain of the next adjacent car, a draft on either of the chains, may be made to simultaneously operate all the brakes of the two cars. So the cars of a whole train may be similarly connected.

Figure 7:
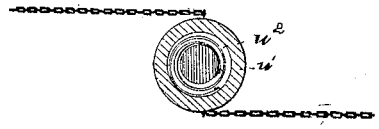
Figure 6:
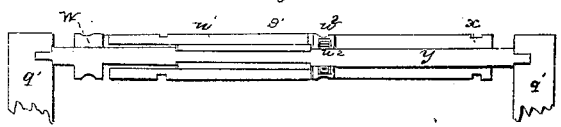

The machinery for the lowering of the brakes so as to throw their treads down upon the rails, and also that for afterward elevating them from the rails may be thus described. Each stirrup or shackle E, has a chain V, extending from it, and connected to the periphery of one of two drums or pulleys W, X, fixed on a transverse shaft Y, which is arranged in the middle and on the top of the truck frame, and turns in bearings at $q$ $q$. Between each of the shackles or stirrups, and the barrel or pulley to which the chain of said shackles is affixed, and nearly over, and somewhat above the shackle, is a guide pulley $r$, over which the chain is carried, the same being as seen in the drawings. In Fig. 2, the chains V, V, of the brakes of the two wheels, on the side of the car, are represented as affixed to opposite sides of their drum W. The same may be said in regard to the chains of the other two sets of brakes, viz, those on the opposite side of the truck frame; they (the said chains) having their ends fastened to opposite sides of the drum or pulley X. A clutch S', is placed on the shaft Y, and has two levers $t, u$, so applied to its part $u'$, as to enable a person by taking hold of the outer arm of either of them, to move said part longitudinally on the shaft, or either toward or away from the drum X. A vertical and longitudinal section of the shaft Y, its clutch and drums is represented in Fig. 6. The part $u^2$, of said clutch is made to turn loosely and transversely on the shaft Y, and is connected to the shaft by a helical spring $v^2$, placed between it and the shaft as seen in Figs. 6, and 7, the latter being a transverse section of the part $u^2$, and the shaft. One end of the spring is attached to the part $u^2$, while the other is fixed to the shaft. The part $u'$, of the clutch slides lengthwise but cannot be rotated on the shaft, it being prevented from so doing by a feather on the shaft. Two chains $w, x$, are fastened at one end of each to opposite sides of the part $u^2$, their two opposite ends being respectively attached to two vertical windlasses $y, z$, arranged as seen in the drawings; each of the said windlasses being provided with a ratchet wheel $a'$, and a spring pawl $b'$, arranged with respect to it as seen in Figs. 1, and 4.

If at any time while the car is in motion on the track, we may desire to throw the tread of the brakes down upon the rails, so as to arrest its movement, we have only to lay hold of one of the levers $t, u$, and move it in such manner as to move the part $u'$, of the clutch, away from the part $u^2$. This will so unclutch or disengage the shaft from the part $u^2$, so as to leave the brakes free to turn over upon their wheels, and so as to carry their treads down upon the rails, and they will be made to so turn by the friction of the wheels against them. While they are so down, if we desire to elevate them, we have only to throw the pawls $b', b'$, out of gear with their ratchet wheels $a', a'$. This will allow the reaction of the spring $v^2$, to move the part $u$, around on the shaft, into its proper position to clutch or engage with the part $u^2$, when next moved against it; it being understood that the said part $u^2$, by means of its chains has been kept stationary during the previous rotary movement of the shaft, caused by the drag of the brake chains when the brakes were moved so as to force their treads down upon the rails. We next move the part $u'$, up to the part $u^2$, and engage them together. This being done, turn one or both the windlasses $y, z$, so as to wind the chains $w, x$, thereon. By so doing the shaft Y, will be turned, and the chains of the brakes wound on their drums, so as to raise up the brakes, and elevate the treads thereof entirely above the rails, thereby at the same time depressing the wheels down upon the rails, and rendering the car ready to proceed onward.

What I claim, as my invention in the above described mechanism, is—

1. The adjustable chisel H, in its combination with the brake tread of each brake, the same being made to operate in manner and for the object above specified.

2. I also claim the combination of mechanism for elevating the treads of the brakes from the rails, the same consisting of the shaft Y, the parts $u^2$, and $u'$, constituting the clutch, and the levers, chains, and windlasses connected therewith; the whole being applied together and made to operate essentially as described.

In testimony whereof I have hereto set my signature this seventh day of March, A. D. 1849.

HORACE T. ROBBINS.

Witnesses:
ANSEL SMITH,
WM. P. WEBSTER.